March 6, 1962 B. CASTIGLIA 3,023,511

WHEEL GAUGE

Filed April 27, 1956 2 Sheets-Sheet 1

INVENTOR
BIAGIS CASTIGLIA
BY Pennie, Edmonds, Morton, Barrows & Taylor
ATTORNEYS March 6, 1962 B. CASTIGLIA 3,023,511

WHEEL GAUGE

Filed April 27, 1956 2 Sheets-Sheet 2

INVENTOR
BIAGIS CASTIGLIA
BY Pennie, Edmonds, Morton, Barrows & Taylor
ATTORNEYS 3,023,511

WHEEL GAUGE

Biagis Castiglia, Bronx, N.Y., assignor to Wheel Aligning Necessities, Inc., Westbury, N.Y., a corporation of New York Filed Apr. 27, 1956, Ser. No. 581,050
3 Claims. (Cl. 33—203.15)

This invention relates to wheel gauges and more particularly to a wheel gauge which may be used to measure camber, caster, king-pin inclination, toe-in and steering geometry of the steerable wheels of a wheeled vehicle by reference to a fixed reference plane.

It is necessary in measuring the geometric characteristics of the steerable wheels of a wheeled vehicle that such measurements be precise, preferably to ¼ of a degree, in order that the wheels may be properly aligned. If the corrections made in reliance on the measurements, or if the measurements themselves are inaccurate, then there will be undue wear and tear on the vehicle tires along with increased difficulty in steering.

The geometric characteristics with which one is usually concerned are camber, caster, king-pin inclination, toe-in and steering geometry. Camber is defined as the amount in degrees that each wheel is tilted out from the vertical at the top. The purpose of camber is to bring the point of contact of the tires with the road more nearly under the spindle, or king-pins, in order to make the vehicle steer easier.

Caster is defined as the angle in a plane parallel to the longitudinal center of the vehicle of backward tilt of the king-pin. This makes the king-pin axis meet the ground in advance of the point of contact with the tire which results in the spindle being more directly over the point of contact of the tire with the ground.

King-pin inclination is the sidewise slant of the king-pin measured in a vertical plane perpendicular to the longitudinal center of the vehicle and its purpose is to improve the steering. Toe-in is the amount in degrees which the front wheels converge toward each other at their front and its purpose is to compensate for the wearing action on the tires due to camber.

Heretofore it has been difficult to design a wheel gauge which could easily measure all of these characteristics with any degree of accuracy and which could still be operated by the ordinary garage mechanic. It is, therefore, an object of this invention to provide for a novel wheel gauge which will measure all or some of the geometric characteristics of the steerable wheels and which may be operated by the ordinary mechanic. It is a further object to provide for an automatic wheel gauge in which the readings may be transmitted to electrical gauges which in turn might be positioned anywhere within the convenient range of vision either of the operator of the vehicle, the person taking the measurements, or both.

Broadly, I propose to have a contact member having a locating surface thereon which may be positioned on a part of the vehicle which is in a fixed position with respect to the spindle axis under all conditions. Attached to this member is an articulated arm which has on one end at least one indicating or measuring means each of which in turn is rotatable about an axis contained in a plane fixed with respect to a base reference plane. This base reference plane may be located on the ground and is not on the vehicle so that all readings are taken with reference to this fixed plane. The arm is provided with means by which the measuring means may be actuated in order to indicate the inclination of the locating face with the precalibrated base reference plane. The base reference plane not only functions as a constant fix, but due to the arrangement of the articulated arm, all error presented by the wheels and of the wheels' movements are cancelled and only the selected angular position of the wheels is recorded by the measuring means.

One measuring means is provided on the articulated arm to measure camber, caster and king-pin inclination, while another measuring means may be provided to measure toe-in or toe-out, and steering geometry. The measuring means themselves may be potentiometers which are included in an electrical system to actuate electrical gauges to measure the position of the locating face of the contact member with respect to the fixed base reference planes.

While my gauge will work with the locating face attached to any portion of the wheel or to the rim on which the tire is mounted, or to the spindle which is in true alignment with the wheel spindle, I prefer to have the locating face directly abut the machined end face of the wheel hub flange as disclosed in my Patent 2,438,-358, filed April 21, 1943, and Patent 2,608,000 filed July 7, 1945, on which a reissue application No. 357,939 was filed May 27, 1953, now Patent No. Re. 24,186. As is disclosed in those patents, the machined end face of a wheel hub flange is the only accurate reference plane built into the wheel which is perpendicular to the spindle axis so that there is no danger of inaccurate readings due to dents in the disc which carries the tire, if a reading be taken from the disc, or in difficulty in lining the gauge up with the wheel axis, if the gauge is attached to other parts of the wheel.

Referring to the drawings which more clearly illustrate the invention,

Figures 1, 2:
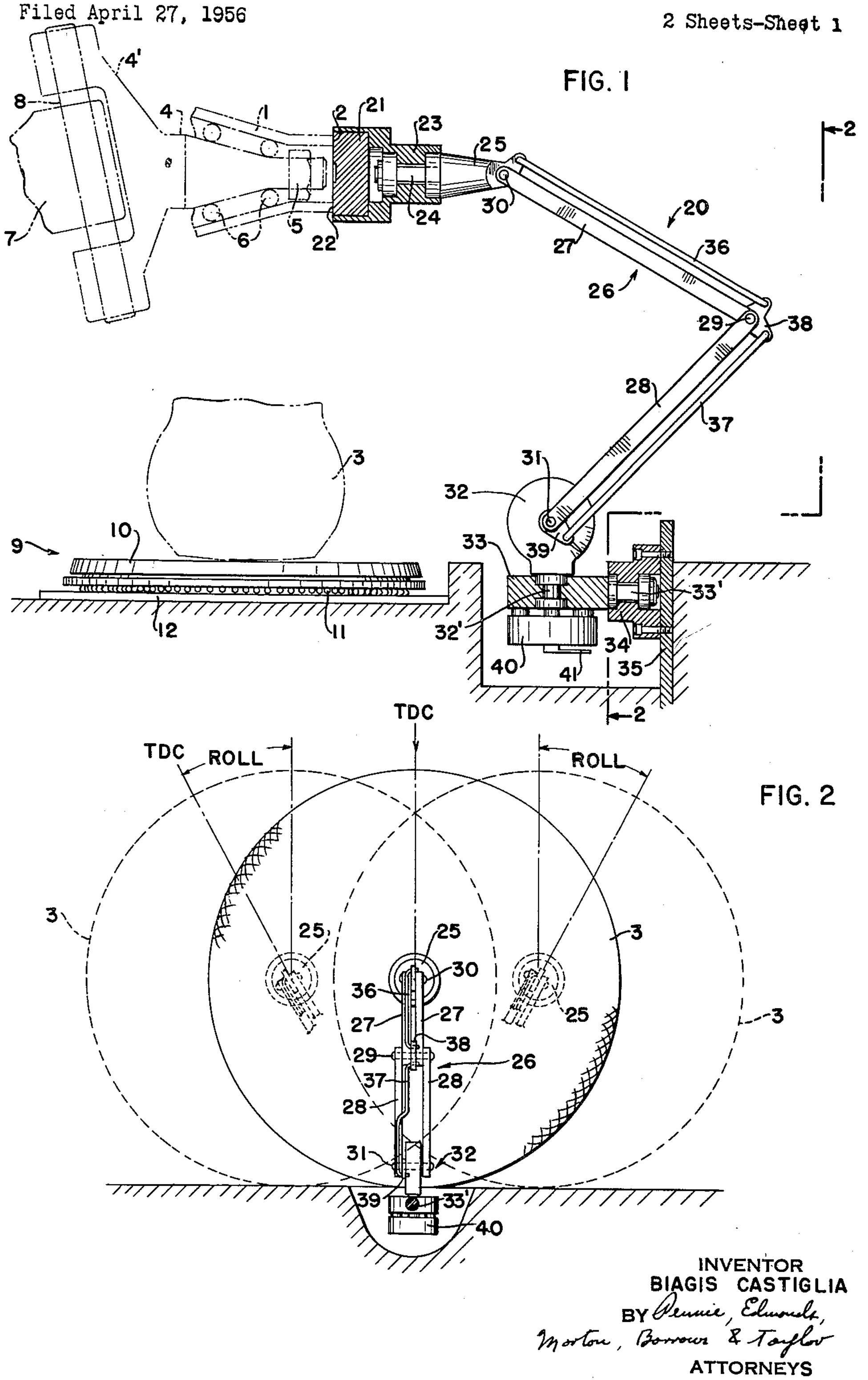
FIG. 1 is a front partial cross-sectional view of my gauge shown attached to the end of a wheel hub.
FIG. 2 is a diagrammatic side view of FIG. 1 illustrating the movement of a wheel when it is turned.

Referring to FIG. 1, 1 denotes a wheel hub having a machined end face 2. This end face is machined when the wheel is made and is the only point built into the wheel which is perpendicular to the bore through which the spindle fits. A tire 3 is mounted on a disc not shown, which in turn is connected to the wheel by the usual studs and nuts. The wheel hub 1 in turn is mounted on the spindle 4 by means of the spindle nut 5. Roller bearings 6 are placed between the spindle 4 and hub 1 in order to insure a minimum of friction. The spindle 4 is integral with a spindle bracket 4' which is mounted on the frame 7 of the vehicle by means of a king-pin 8, or a ball joint, not shown.

The tire 3 rests on a turntable 9 which consists of a turn plate 10 mounted on roller bearings 11 which rest on a bed plate 12. The plate 10 may freely rotate and slide over the bearings 11 so as to minimize resistance when the wheel 3 is turned.

The gauge denoted generally by the numeral 20 consists of a contact member 21 having thereon a locating surface 22. Member 21 preferably is a strong magnet in order that it may be attached directly to the machined face 2 of the hub to insure a firm abutment therewith. Member 21 in turn is carried in a cage 23 which is journaled on a shaft 24 which in turn is connected to lug 25. Lug 25 has connected on one end an articulated arm denoted generally by 26, which consists preferably of two separate arms 27 and 28 joined together by pin 29. Arm 27 is connected to lug 25 by pin 30 about which it may rotate. Arm 28 is rotatably mounted by pin 31 to a measuring means 32. Measuring means 32 is mounted on a shaft 32' which is journaled in a bracket 33. Bracket 33 in turn is attached to a shaft 33′ which is journaled in fixed bracket 34 and which extends 90° to shaft 32′. Bracket 34 is affixed to a vertical plate 35 which may be embedded permanently in the ground. This plate which extends parallel to shaft 32′ serves as a fixed base reference plane from which camber, caster, toe-in and king-pin inclination are determined.

The arms 27 and 28 have mounted thereon links 36 and 37 which are in turn joined by means of idler link 38. Arm 36 is attached eccentrically to lug 25 while arm 37 is connected at one end to an indicator 39 which may either be a direct reading indicator or be an arm for actuating a potentiometer.

It is seen that if locating surface 22 of the contact member is tilted from the vertical, it will in turn by means of the arms 27, 28 and links 36, 37 cause the indicator arm 39 to rotate about an arm extending parallel to the base reference plane thus measuring the degree of inclination of locating surface 22 with the vertical base reference plane determined by plate 35. Thus, the inclination of the locating surface is the angle, measured in a vertical plane, between the locating surface 22 and the base reference plane 35.

Figure 3:
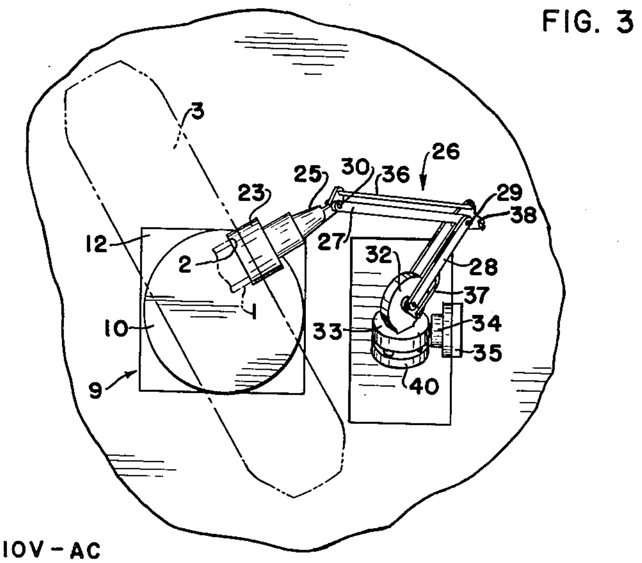
FIG. 3 is a plan view of the gauge as shown in FIG. 1 illustrating a wheel in a 20 degree turn-out position.

The articulated arm 26 may also be connected to a second measuring means 40 which is mounted on bracket 33. Shaft 32′ connects with indicator arm 41 which will measure the toe-in in degrees angularity of a front wheel with respect to the base reference plane directly on the measuring means 40. Indicator arm 41 rotates about an axis extending in the vertical plane which is parallel to the base reference plane. Measuring means 40 may be a potentiometer for actuating an electrical gauge. Thus when the wheel 3 is rotated as shown in FIG. 3, it will cause the articulated arm to swing and so move indicator 41 to indicate the amount of turn of the wheel from the base reference plane. Thus, the angularity of the locating surface is the angle, measured in a horizontal plane, between the locating surface 22 and the base reference plane 35.

It is necessary that provision be made to compensate for the roll of the front wheel when it is turned on the turntable 9. The wheel will roll a slight amount when turned, even when the vehicle is standing still because the wheel is placed at a definite radius from the center of turn. This is clearly shown in FIG. 2 where TDC represents the top dead center of the wheel where the doted portions illustrate the movement of the top dead center when the wheel is turned. Besides roll, there is a lateral or sideways movement which is caused by the roll taking place along an arc of the turning circle. Therefore, in order for the readings to remain accurate before and after the wheel is turned, it is necessary that the wheel and tire roll freely in relation to the ground if there is to be no scuffing of the tire and subsequent distortion which might cause an inaccurate position of the spindle and wheel hub with relation to the base reference planes. For this reason, turn plates 10 and 12 are constructed so that the plate 10 may move in any direction with respect to plate 12. By making arm 26 articulated, the contact member may move vertically, laterally and rotate to follow the wheel hub when the wheel is turned.

FIG. 3 shows the wheel in position for a 20 degree inside turn and illustrates how the articulated arm turns with the wheel. It is obvious that if the wheel were turned 40 degrees in the opposite direction so as to give a 20 degree outside turn, that the articulated arm would take a position similar to that shown in FIG. 3, except that the arm would be below the potentiometers as shown.

A typical installation of my novel invention would have two wheel gauges, as shown in FIG. 1, straddling a meauring pit or stand for measuring the front wheel geometry of a wheeled vehicle. Two turntables, such as illustrated in FIG. 1, would be embeded in the ground with two base reference plates to which the articulated arms are attached.

In order to determine the geometric characteristics of the front wheels of a vehicle, the vehicle would be driven onto the turntables so that the front wheels rested on the turntables in a substantially straight-ahead posiion. The steering wheel of the vehicle would then be carefully centered and locked.

The contact member 21 of each gauge would be then attached to the end of the wheel hub 1. Indicator 39 would then indicate camber directly on measuring means 32, or, if the measuring means were a potentiometer, then it would indicate camber on an electrical gauge placed anywhere that was convenient.

Caster of each wheel is determined by turning the wheel 20 degrees in one direction, taking a reading on measuring means 32, then turning the wheel 40 degrees in the opposite direction and taking a wheel reading on the measuring means 32. Caster will then be the difference in the two readings.

King-pin inclination of each wheel is determined by taking the average of the two readings on measuring means 32 at the two extremes of travel when the wheel is turned 20 degrees for an inside turn and 20 degrees for an outside turn. The difference between this calculated reading for the center position and the camber reading will give the vehicle king-pin inclination.

Toe-in, or toe-out, as the case may be, is determined by measuring means 40 and is the difference between the readings taken for both front wheels when the steering wheel is in the center position. Toe-in is measured from a second base reference plane which extends, as seen in FIG. 1, vertically through the axis of shaft 33′ and contains the rotational axis of shaft 33′ so that it is perpendicular to the base plane defined by plate 35. The measuring means 40 of each gauge will then read the difference in degrees of the angularity of the locating surface 22 with respect to its base reference plane. As the wheel is turned, the articulated arm 26 will also be forced to turn so causing the indicator 41 to rotate about the measuring means 40 attached to the bracket 33. Measuring means 40 may also be a potentiometer in order to actuate an electrical gauge placed at a convenient spot for easy reading.

By providing for the measuring means to be potentiometers, it is possible to arrange the electrical gauges so that they may be easily read by both the operator of the vehicle and the mechanic aligning the wheels. Thus, if the mechanic is in a pit below the vehicle in order to correct the alignment, then he may apply correction shims to the different parts of the steering mechanism while at the same time reading the gauges before him. In existing apparatus, the mechanic does not have the gauges continually before him so he must make a correction, then refer to his gauge and then make subsequent corrections.

While I have shown the articulated arm 26 composed of two separate arms 27 and 28, it is possible to have an articulated arm having more than two separate arms if all of the measurements are to be made, or to have even a single telescoping arm, provided that all of the arms had the proper linkage to actuate the measuring means. The reading from such a device would still refer back to a base reference plane as disclosed above and could be combined with potentiometers to actuate an electrical indicator gauge to give the desired geometric characteristics.

Figure 4:
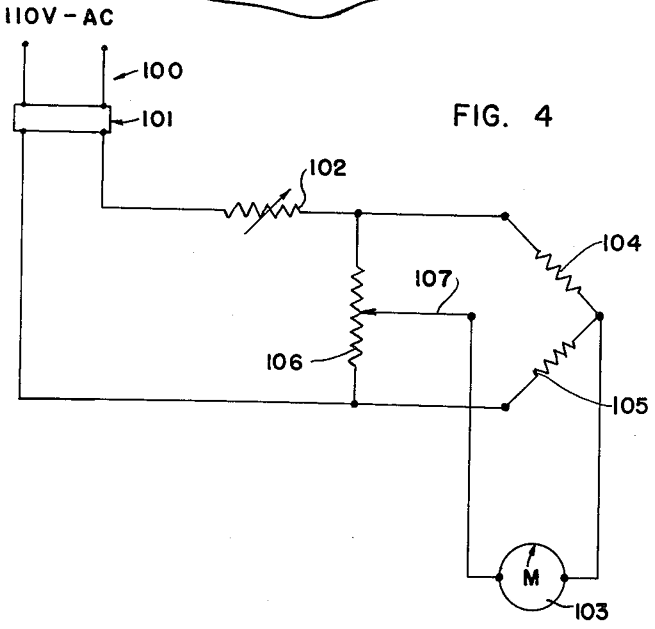
FIG. 4 is a schematic view of a wiring diagram illustrating the electrical circuit of an indicator gauge.

FIG. 4 illustrates schematically an electrical circuit by which one electrical gauge is operated to give either camber, caster, king-pin inclination, steering geometry and toe-in. The circuit is connected to a source of alternating current 100 by means of a rectifier 101. A rheostat 102 is provided to change the scale of reading on meter 103 to provide either coarse or fine readings of degrees.

Equalizing resistance elements 104 and 105 are connected with gauge 103 and a bridge resistance element 106 is connected in series with the meter. Slide 107 may be connected directly to the shaft 32' (for the toe-in measuring means) or indicator 39 (for the camber measuring means) so as to change the direction and intensity of the current passing through the meter to accurately indicate the inclination in degrees of the end of hub 1 with respect to the fixed base reference planes.

The reading on the meters may be projected by means of lenses on to a wall in order to magnify and also to position so that they may more easily be read by either the mechanic making the adjustments or by a person sitting in the vehicle.

Having thus described my invention, what I claim is:

1. A wheel gauge for measuring camber of the steerable wheels of a wheeled vehicle comprising a contact member having a locating surface thereon adapted to be held in alignment with the wheel axis by firm abutment of said locating surface with the machined end face of a wheel hub, an articulated arm having one end connected to said contact member, an angle reference member rotatably attached to the other end of said arm, said reference member being rotatable about an axis contained in a plane fixed with respect to a base reference plane, an indicator mounted on the end of said arm on which said reference member is mounted, linkage means mounted on said arm connecting said contact member with said indicator to measure inclination of said locating surface with respect to said base reference plane.

2. A wheel gauge for measuring the geometric characteristics of the steerable front wheels of a wheeled vehicle, each wheel having a spindle axis, comprising a contact member having a locating surface thereon adapted to be held in predetermined alignment with the wheel spindle axis by firm abutment of said locating surface with a portion of said vehicle which is at all times fixedly positioned relative to said wheel spindle axis, an articulated arm connected at one of its ends to said contact member, a first means connected to the other end of said arm for measuring the inclination of said locating surface with respect to a base reference plane, a second means connected to said other end of said arm for measuring the angularity of said locating surface with respect to said base reference plane, said first and second measuring means each having an indicator arm rotatable about a first and second axis respectively, said first axis being at all times perpendicular to said second axis, and said second axis in turn being at all times contained in a plane in fixed parallel relationship to said base reference plane.

3. A wheel gauge according to claim 2 wherein said measuring means are potentiometers for actuating electrical gauges.

References Cited in the file of this patent

UNITED STATES PATENTS

| | | |
|---|---|---|
| 1,922,344 | Bagge | Aug. 15, 1933 |
| 2,090,294 | Haucke | Aug. 17, 1937 |
| 2,115,347 | Sutton | Apr. 26, 1938 |
| 2,346,360 | Creagmile | Apr. 11, 1944 |
| 2,603,881 | Holaday | July 22, 1952 |
| 2,608,000 | Castiglia | Aug. 26, 1952 |
| 2,645,860 | Bender et al. | July 21, 1953 |
| 2,737,728 | Taber | Mar. 13, 1956 |
| 2,765,540 | MacMillan | Oct. 9, 1956 |